May 6, 1941.    E. B. ELDER    2,240,766
TREE PROTECTOR
Filed Feb. 16, 1939    2 Sheets-Sheet 1

INVENTOR
*Earl B. Elder*
BY
*Norman T. Holland*
ATTORNEY

May 6, 1941.  E. B. ELDER  2,240,766
TREE PROTECTOR
Filed Feb. 16, 1939  2 Sheets-Sheet 2
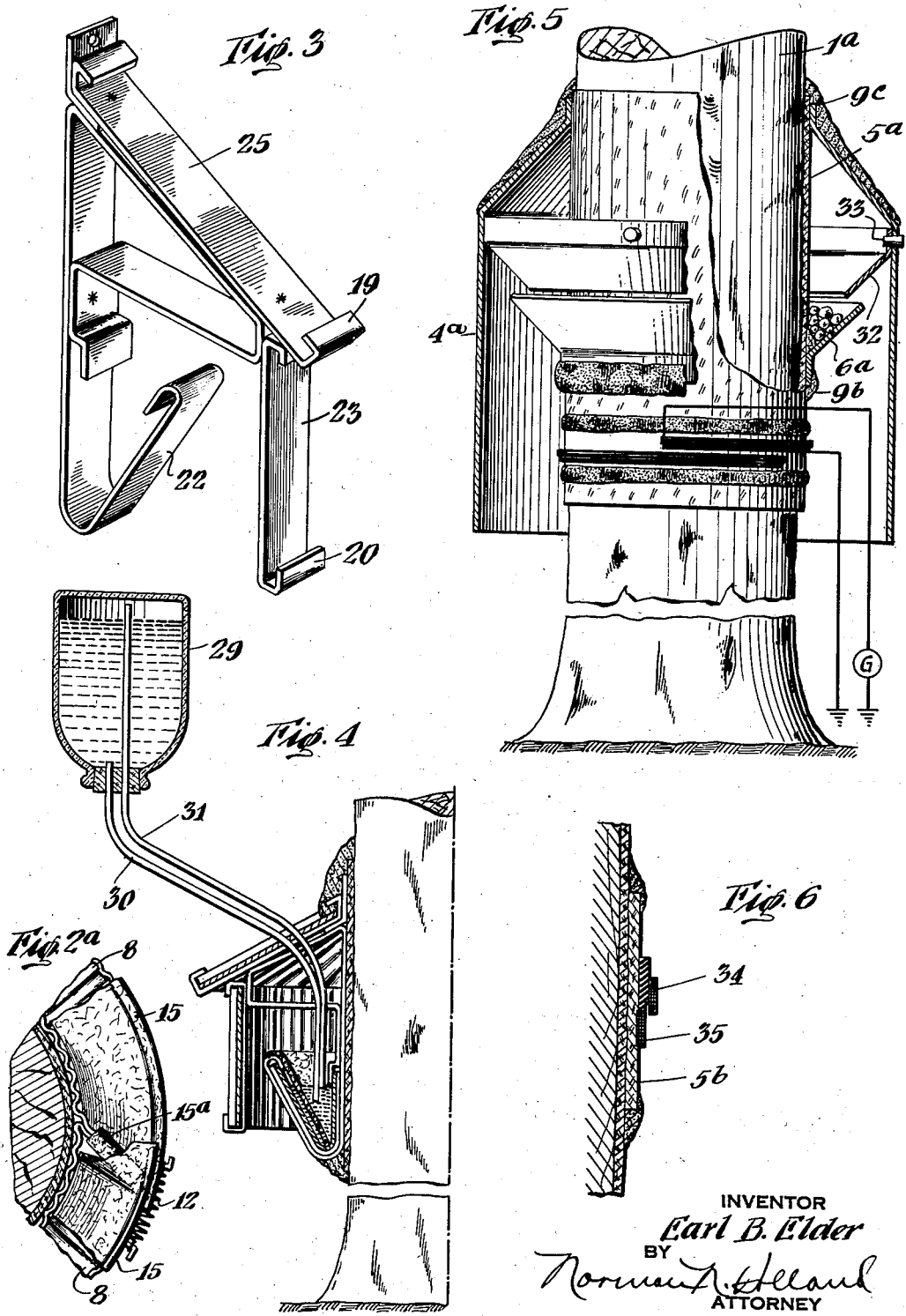

Patented May 6, 1941

2,240,766

UNITED STATES PATENT OFFICE 2,240,766

TREE PROTECTOR

Earl B. Elder, Alhambra, Calif.

Application February 16, 1939, Serial No. 256,622

10 Claims. (Cl. 43—108)

The present invention relates to an improved tree protector of the type adapted to prevent insects from crawling up the trunk of the tree.

The present commercial methods of insect and scale control are to spray the tree with chemicals poisonous to the insects or to place a tent over the tree and fumigate with hydrocyanic gas. If these methods are applied when the weather is too hot, they burn the tree; if they are applied too soon, they do not get all the insects and if applied too late, considerable damage has already been done. Fumigation does not do much for future protection of the tree. In many cases, the insects plant a new crop within a few days. While the above are the usual commercial methods, devices are illustrated in patents adapted to fit about the trunk of the tree to prevent insects from crawling up the tree. These devices have not been commercialized due to the various impracticable natures of their constructions. The average present protection does no more in this respect than wrapping a piece of burlap or paper saturated with tar or stick material about the trunk of a tree. Tar and other substances generally dry out quickly and become ineffective, or the insects, in crawling over, form a sort of bridge so that other insects can crawl over the obstruction.

The present invention aims to overcome the objections to the prior art by providing an effective tree protector which will prevent insects from crawling up the trunk of the tree for long periods of time without requiring the frequent attention of an individual or operator. The device permits growth of the tree without damage thereto, and in the preferred embodiment provides a moat or a gas chamber through which the insects must pass in climbing the tree. In this way a small amount of liquid or gas may be used for repelling or killing the insects.

An object of the present invention is to provide an inexpensive tree protector which may be serviced with a minimum of time at infrequent intervals.

Another object of the present invention is to provide an inexpensive tree protector which will operate for long periods of time without requiring attention or service.

Another object of the present invention is to provide an inexpensive tree protector which will permit the growth of the tree without impairing the protector or the seal between it and the tree.

Another object of the present invention is to provide a tree protector having a moat through which insects passing up the tree will have to crawl.

Another object of the present invention is to provide a tree protector adapted to maintain a gas chamber through which insects in passing up a tree will have to crawl.

Another object of the present invention is to provide electrical means for killing or repelling large insects and gas or other means for repelling or killing small insects.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein—

Fig. 1 is a side elevational view, partly in section, illustrating a preferred embodiment of the invention;

Fig. 2 is a top plan view, partly in section, illustrating the embodiment shown in Fig. 1;

Fig. 2a is a fragmentary sectional view illustrating the adjoining trough edges and overlapping ends of the wick;

Fig. 3 is a view of a preferred type of supporting bracket;

Fig. 4 is a diagrammatic view illustrating automatic means for supplying an insecticide to the moat of the preferred embodiment illustrated in Fig. 1;

Fig. 5 is a sectional view illustrating an electrical repellant combined with a protector generally similar to the type illustrated in Fig. 1; and Fig. 6 is a detailed sectional view giving additional features of the electrical repellant.

Referring again to the drawings and more particularly to Figs. 1 and 2, there is shown a fragmentary section of a tree 1 to which is applied a tree protector comprising a moat 2 and a shield 4 therefor. The structural features of the moat and shield as applied to the tree will now be described. Preferably, a sheet of asbestos 5 or other suitable material is wrapped about the tree to serve as an undersupport for both the shield and the moat. The moat may comprise a V-shaped or trough-like member 6, both sides of which may be corrugated to permit expansion and to take up irregularities in the shape or size of the tree. Preferably, the corrugations extend throughout the height of both sides of the V-shaped trough. The corrugated inner side rests firmly against the asbestos sheet 5 as shown in the drawings. To facilitate application of the trough-like member and to permit growth of the tree, the ends thereof overlap as shown at 8 and are held in overlapped position by a spring 12 or by a U-shaped engaging member 10. In the preferred embodiment, for illustrative purposes, both holding means are shown, although one is sufficient. In this way, the overlapped ends may move with respect to each other to fit upon trees of varying sizes, and to permit a substantial growth of the tree.

In order to form a more secure seal which will prevent insects from crawling under the member 6 and thereby avoid the necessity of crawling over the moat, a suitable sealing or calking compound 9 is applied at the lower edge of the asbestos sheet. The calking compound may be any suitable material but preferably is an elastic, slow drying compound which is non-injurious to the plant. Such compounds do not tend to harden and will permit relative movement of the parts, particularly the ends of the moat 6 without breaking or impairing the seal. In addition, if after a considerable period of time a large amount of tree growth has taken place and any cracks are formed in the seal, additional calking compound may be added very readily to repair the seal.

While a liquid repellent or insecticide 14 is shown in the drawings, it is to be understood that the invention is not limited in any way to the repeller used; various types are now known and applicant contemplates use of a liquid in some cases, in other cases an absorbent material such as asbestos saturated with a liquid, and in other cases, dry or powdered gas generating substances. Preferably, the repellant used is of a type which either evaporates slowly or to no appreciable extent at all. Or it may be composed in part of a hygroscopic substance, that is, one which readily absorbs and retains moisture. The use of such substances in the moat minimizes the need of re-servicing it at frequent intervals. The tree protectors may thus be left without inspection and attention for considerable periods of time. Glycerine is an example of a hygroscopic substances which may be used as a repellant carrying base. An excellent repellant is found to be the combination of glycerine, pine oil treated with potassium oleate, and nicotine. Another repellant is pine oil. Various non-drying oils are examples of bases which do not quickly evaporate. Where a gas generating substance is used, it is preferably one which forms a gas heavier than air so that the gas may remain in the moat or pass slowly over the side of the moat into the chamber formed by the shield which will be described hereinafter.

In order to make the liquid repellant or gas more effective, a capillary material such as a wick 15 may be applied over the outer side of the member 6 so that the bottom of the wick projects downwardly into the moat to contact the liquid, and the outer and upper end extends over the outer rim of the moat. In this way the insects contact the end of the wick prior to reaching the moat and are killed and drop down to the ground instead of the usual way of getting into the moat and dying there. In the present case they cannot fill up the moat or form bridges therein over which other insects may pass. Also, to prevent insects crawling along the edges of the moat where the latter overlaps at its ends a wick portion 15a (Fig. 2a) preferably overlies the adjoining moat edges. This overlapping portion of the wick conveys a liquid up over the adjoining moat edges and prevents passage of insects thereacross and on up the tree trunk. If desired, a separate piece of wick 15a may be utilized alone or with the wick 15 with its ends dipping into the moat liquid and its center part lying over the overlapping moat edges.

The shield 4 preferably comprises a conical top 16 made from corrugated sheet metal and a lower skirt part 18. The lower part is substantially cylindrical and extends downwardly below the top of the moat. Where a gas producing chemical is used in the moat, the shield preferably extends about six inches below the bottom of the moat in order to provide a very effective gas chamber. The free ends of the parts forming the top 16 and the skirt 18 of the shield overlap, as shown at 17 and 21 respectively, and may be held in position by tabs 19 and 20 which will be described later. A calking compound 9a which covers the overlapping joint of the top or roof provides a more secure seal, permits adjustment for different sizes of tress and allows unhampered growth of the tree. The upper conical part of the shield adjacent the tree trunk is covered with a calking compound 9b to provide a weatherproof construction.

The top 16 and skirt 18 of the shield 4 may be supported in position by suitable hangers or brackets nailed to the tree and attached to the shield. These hangers may be made in any convenient manner from light sheet or strip material or wire. A preferable type of hanger (Fig. 3) comprises essentially three main parts; a moat supporting portion 22, a skirt supporting portion 23 and a top or roof supporting portion 25. These parts may be quickly and economically spot welded together to form a unitary structure.

To erect the tree guard in operative position the following procedure may be conveniently adopted; the protecting band of asbestos is wrapped around the tree, the hangers are then affixed to the tree by nailing or otherwise, the moat 6 is then placed upon the moat supports 22 and the wick 15 is inserted and a liquid or chemical 14 added, then the skirt 18 is placed in position on the skirt supports 23 and the ends turned up to form the retaining tabs 20, and finally the corrugated top or roof 16 is placed in position on the roof supports 25 and their ends turned to form the retaining tabs 19. If desired, additional separate skirt hangers 26 may be attached by spot-welding or the like to the roof 16 at intervals to assist in retaining the skirt 18 in position.

Any pressure caused by growth of the tree is taken up by the hangers and transmitted to the roof, skirt and moat, which parts are all free to yield. There is no girdling or strangling effect on the tree.

In order to facilitate filling the moat, the roof 16 has an aperture with a suitable movable cover or lid 28. This permits a liquid or chemical to be placed in the moat without disturbing the structure of the protecting shield.

While the moat will contain sufficient liquids or solids to be effective for a substantial period of time due to the moat being shielded from wind and rain, it is sometimes desirable to eliminate the liquid servicing to an even greater degree. This may be achieved by the structure shown in Fig. 4, wherein a bottle 29 in inverted position is connected by tubes 30 and 31 to the moat. One of the tubes ends at the lower end of the inverted container and supplies the liquid to the moat; the other tube extends to the air space at the upper end of the inverted bottle and has its lower end terminating at the point in the moat where it is desired to maintain the liquid level. Whenever the level in the moat is below the end of tube 31, air will pass up into the bottle and liquid will pass through tube 30 from the bottle into the moat. As long as the lower end of tube 31 is covered with liquid, a vacuum forms in the bottle which prevents the passage of liquid into the moat. In this way, the constant passage of liquid and the level thereof in the moat may be maintained for a long period of time.

In Fig. 5, a slightly different construction of moat and shield is illustrated in combination with an electrical repellant. Larger insects such as caterpillars, by crawling into the moat, may fill or impair it so that other insects may crawl over them unless the moat is unduly large. The smaller insects do not impair the moat in this way. On the other hand, it is much more difficult to repel or kill smaller insects with an electric repeller than it is the larger because the nearer the electrical contacts are together, the greater is the likelihood of arcing and short circuits. Hence, a good electrical repeller may be utilized for large insects, but will be substantially ineffective for smaller ones, whereas combining it with applicant's invention enables the two to form a very effective device.

Referring more particularly to Fig. 5 and to the structure of the moat 6a, the latter is extended about an asbestos or the like sheet 5a on the trunk of the tree 1a. The moat in this case flares outwardly from the asbestos sheet. Such a construction is particularly applicable for the use of crystal or powdered chemicals where a liquid seal is not essential. The calking compound 9b is to form a seal which will prevent insects from crawling under the moat. The shield 4a may be a single sheet of metal, the upper part of which is slit and bent to form the conical top. The top of the shield is covered with calking compound 9c to make it rain and weather proof. Preferably, a conical member 32 attached to the skirt is provided with corked apertures formed above the inclined guiding shelf so that a chemical in either powder or crystal form may be fed through the apertures 33 and guided by the member 32 into the annular receptacle 6a.

Mounted below the receptacle 6a are conductors 34 and 35 which are insulated from the trunk of the tree by an asbestos sheet 5b, or other suitable insulation. The conductors 34 and 35 are insulated from each other and spaced sufficiently far apart to prevent arcing. The conductors are connected to a source of electrical energy here illustrated as a generator G. Ordinarily a suitable power line will furnish the current. By utilizing the two devices, the conductors may be spaced sufficiently far apart to prevent arcing, and at the same time may be close enough to kill the larger insects such as caterpillars. The smaller insects which are able to pass over the electric device will have to climb into the receptacle 6a where the chemical will either repel or kill. It will be understood also that the gas chamber referred to in connection with Fig. 1 extends, when applied to Fig. 5, down below the bottom of the receptacle 6a and preferably below the electrical device. In this way, the shield 4a protects the electrical device against rain and snow which tend to form short circuits, and likewise protects the receptacle 6a against the elements.

In many cases a tree band of a single size is utilized, as the trees of large orchards are ordinarily of about the same age and are substantially the same size. The bands are applied and are properly calked. Thereafter, the device accommodates the growth of the tree without impairment of the seal or the effectiveness of the device. An insect crawling up the tree trunk will in many cases turn back or fall to the ground when it has proceeded sufficiently far into the gas chamber formed by the shields 4 or 4a. In some cases, the insects crawl up the side of the moat 6, but when they contact the end of the wick 15, they will be repelled or killed. Even if they should pass over the end of the wick 15, they will still have to pass down through the liquid in the moat which forms an invincible barrier. The shield prevents rain or snow from getting into the insecticide, and forms an effective gas chamber at the same time. Where the device in Fig. 4 is utilized, a constant level of liquid is maintained in the moat for a long period of time. Because of the efficiency of the device and the little amount of gas which must be generated to make it effective, sufficient chemicals can be placed in the moat to make the device have an operative effect for substantial periods of time without an auxiliary supply. The combination of the electrical device illustrated in Fig. 5 with the gas or moat device provides an even more effective device, but one which is slightly more expensive, and in some cases inconvenient because of the lack of a suitable source of electricity.

It will be seen that the present device forms an effective protector for trees and the like from various types of insects. The undesirable insects for the most part crawl up the trunks of the tree, whereas the desirable insects for the most part fly; hence, the present device does not repel the desired types of insects and does repel the undesired types of insects. In addition, the device requires very little attention and only infrequent servicing. Furthermore, the fruits are not subjected to lead and other poisons which frequently are present when they reach the consumer, unless the fruit is thoroughly processed to remove such poisons left by spraying. The fruits are protected without contaminating them in any way. The protector is inexpensive, and may be readily made without special parts or devices and is fully capable of withstanding the rough usage and the various weather conditions and changes to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a tree protector, the combinaton of a trough-like member extending continuously about the tree to receive an insecticide or insect repellant, and the continuity of the trough-like member being interrupted only at one point where the ends thereof meet, the ends of said trough-like member being closed to prevent leakage of said insecticide or insect repellant and said closed ends overlapping each other to allow substantial growth of the tree and movement of said closed ends with respect to each other without causing separation of said ends, and means for resiliently holding the ends in overlapped relation to permit growth of the tree.

2. In a tree protector, the combination of a corrugated trough-like member extending about the tree to receive an insecticide or insect repeller, the ends of said trough-like member being closed and with the closed ends overlapping to permit application to trees of different sizes and to permit growth of the tree, means for holding the ends in overlapped relation and a calking compound intermediate said overlapped ends and intermediate said trough-like member and the tree adapted to permit growth of the tree and expansion of the trough-like member without breaking the seal between the overlapped ends and between the member and the tree.

3. In a tree protector, the combination of a continuous trough-like member with closed ends extending closely about the tree to receive an insecticide or insect repeller, the ends of said trough-like member overlapping to permit growth of the tree and expansion of the trough-like member without interrupting the trough formed about the tree by said trough-like member, and means for holding the ends in overlapped relation, a shield adapted to extend closely about the tree above said trough-like member and having a part depending downwardly over and below said trough-like member, and means for holding said shield in position.

4. In a tree protector, the combination of a member extending closely about and carried by the tree adapted to form a reservoir for an insecticide or insect repeller, the ends of said member having upstanding portions to retain insect repellant therein and said ends overlapping to permit growth of the tree and expansion of the member without interrupting the continuity of the reservoir about the tree and means for resiliently holding said ends in overlapped position, a shield adapted to be carried by and extend closely about the tree above said first member, said shield having overlapping ends to permit growth of the tree and expansion of the shield and means for resiliently securing said overlapped ends in position and a calking compound forming a seal between said shield and said tree and between said member and said tree for preventing passage of insects up the tree between the tree and the reservoir member and between the tree and the shield.

5. In a tree protector, the combination of a moat member extending about the tree to retain an insecticide or insect repeller, a reservoir for supplying said moat member with a fluid, said reservoir being connected to the member by means of a pair of tubes, one tube being adapted to admit air to the reservoir and the other to release liquid from the reservoir to the member to maintain a constant level of fluid therein.

6. In a tree protector, the combination of a moat member extending about the tree having overlapping ends, means for retaining the said overlapping ends in position, a shield secured to said tree above the moat member and having an annular wall adapted to extend downwardly below said member, and a container having a liquid therein operatively connected to said moat member to maintain a constant level of fluid therein.

7. In a tree protector, the combination of means extending about the trunk of the tree forming a moat adapted to expand with tree growth, an expansible shield secured to said tree having a downwardly depending part spaced from said moat and extending downwardly below said moat at least as far as a point adjacent the lower edges of the moat, and means on said shield adapted to expose said moat to facilitate filling the moat with an insecticide or insect repeller.

8. In a tree protector, the combination of a substantially V-shaped trough-like member with an outwardly inclined side wall and closed end portions extending about the tree to receive an insecticide or insect repeller, one of the closed ends of said trough-like member overlapping the other to provide a trough about the entire circumference of the tree, means for holding the overlapped ends in position and a wick material extending downwardly into said trough-like member and adapted to be supported by said outwardly inclined side wall and projecting above the outer rim of the trough-like member for substantially its entire length to conduct the insect repeller to the side of the rim to prevent insects from crawling into the trough-like member.

9. In a tree protector, the combination of a trough-like member extending about a tree to receive an insecticide or insect repellant and having closed overlapping ends and an outwardly inclined side wall, means for yieldably holding the overlapping ends in position, a wick material extending downwardly into said trough-like member and resting against and projecting above the outer rim of the outwardly inclined side wall to conduct the insect repellant to the side of the rim to deter insects from crawling into the trough-like member, and a wick portion extending downwardly into said trough-like member and projecting above and over the closed overlapping ends thereof to conduct insect repellant from said trough-like member to the rim of said overlapping portions to deter insects from passing thereacross.

10. A tree protector comprising, in combination, an annular trough-like member extending around the tree to receive an insecticide or insect repellant, portions adjacent the ends of said trough-like member being closed to retain the insecticide or insect repellant therein and said ends overlapping each other to permit adjustment of the diameter of said annular trough-like member while maintaining the effective continuity of the trough, a shield attached to said annular member and extending around the tree above said member, and means connecting said shield with said tree so as to prevent passage of insects up the tree between the shield and the tree.

EARL B. ELDER.